XR 4,548,668

United States Patent [19]

Roth et al.

[11] Patent Number: 4,548,668

[45] Date of Patent: Oct. 22, 1985

[54] COMBINATION MACHINE FOR ASSEMBLING CONTAINER COMPONENTS

[75] Inventors: Donald J. Roth, Westport; Charles S. Kubis, Weston, both of Conn.; John Walter, Evergreen Park, Ill.

[73] Assignee: Continental Can Company, Inc., Stamford, Conn.

[21] Appl. No.: 456,959

[22] Filed: Jan. 10, 1983

[51] Int. Cl.[4] .......................... B32B 31/00; B65C 9/40; B29D 3/00; B31F 5/00

[52] U.S. Cl. .................................... 156/357; 156/362; 156/366; 156/423; 156/556; 156/566; 156/567; 156/578; 53/276; 53/309; 53/367; 118/317; 118/408; 118/622; 118/624; 493/84; 493/102; 493/128; 493/136

[58] Field of Search ............... 156/578, 567, 566, 556, 156/423, 366, 362, 357, 356, 294; 493/84, 102, 128, 136; 53/583, 276, 287, 309, 367; 118/622, 624, 408, 317

[56] References Cited

U.S. PATENT DOCUMENTS

| | | | |
|---|---|---|---|
| Re. 29,448 | 10/1977 | Brown et al. | 156/294 |
| 3,078,912 | 2/1963 | Hitzelberger | 156/556 |
| 3,216,874 | 11/1965 | Brown | 156/69 |
| 3,499,068 | 3/1970 | Brown | 156/73.5 |
| 3,673,043 | 6/1972 | Carter | 156/556 |
| 3,946,540 | 3/1976 | Solberg et al. | 53/367 |
| 4,238,267 | 12/1980 | Konstantin | 156/556 |
| 4,247,357 | 1/1981 | Kontz | 156/578 |
| 4,280,268 | 7/1981 | Gordon | 156/294 |
| 4,305,772 | 12/1981 | Valyi | 156/423 |

*Primary Examiner*—Edward Kimlin
*Assistant Examiner*—Merrell C. Cashion, Jr.
*Attorney, Agent, or Firm*—Charles E. Brown

[57] ABSTRACT

This relates to a machine for assembling end units with container bodies. The container bodies have cylindrical open upper ends over which a cylindrical lower portion of an end unit or dome is telescoped with the overlapping portions being adhesively bonded together. The machine receives the end units serially and by way of a Ferris wheel type conveyor moves the end units first to an adhesive applicator where a band of adhesive is applied to the interior of each end unit, after which each end unit is then telescoped over and pressed into position relative to an associated body. The operation of the machine is continuous.

15 Claims, 11 Drawing Figures

33
155
40
41
42
20
18
17
29
31
33
3
86
3
76
20
15
34
38
34
34
126
20
18

34
35
18

FIG. 8
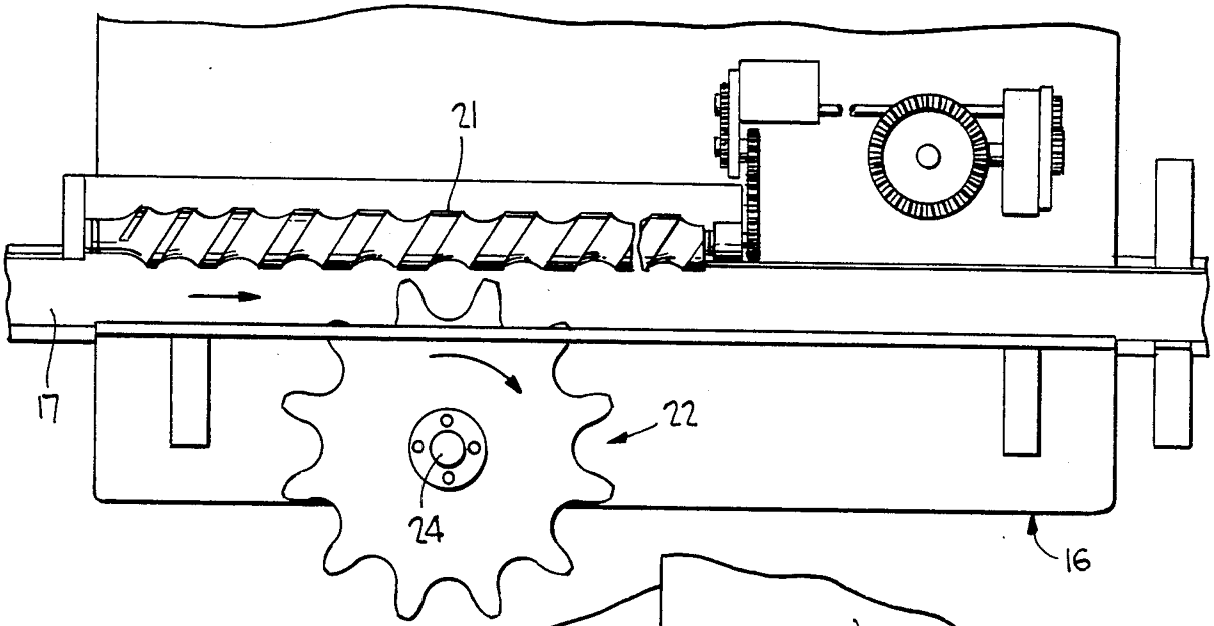
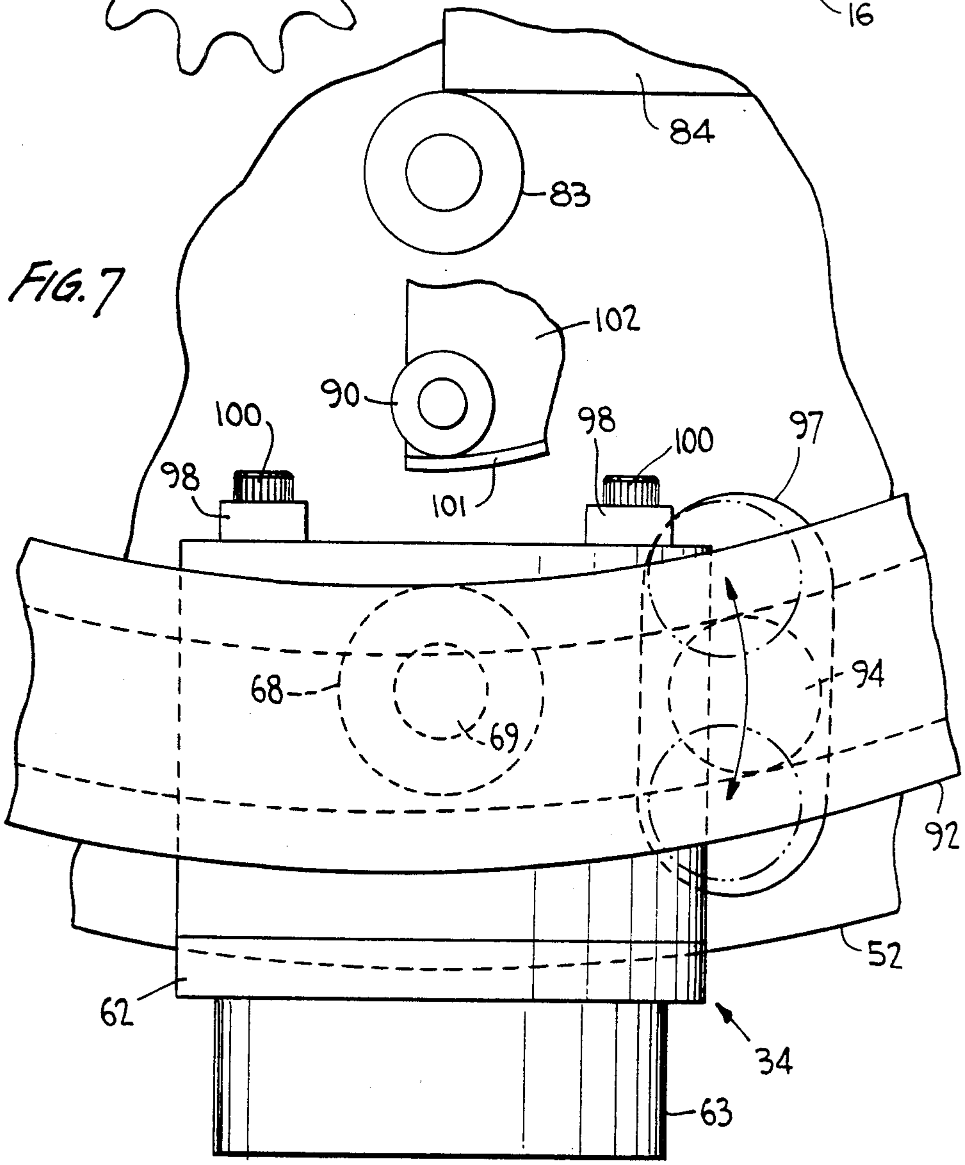
FIG. 7

COMBINATION MACHINE FOR ASSEMBLING CONTAINER COMPONENTS

This invention relates in general to new and useful equipment for assembling container components, and more particularly to an apparatus for receiving container top units, applying a band of adhesive on an interior cylindrical surface of such units, and then applying the units in telescoped relation to upper ends of container bodies.

A principal feature of this invention is the elimination of time delaying reciprocating movement of a conveyor for such end units. In accordance with this invention, there is provided an endless conveyor of the Ferris wheel type which carries a plurality of carriers, and each carrier is particularly constructed to receive an end unit, to present that end unit to an adhesive applicator, and then first to align an upper end of a container body with the end unit and then to telescope the end unit relative to the container body.

Another feature of the invention is the construction of each carrier which includes a body having at its radial outer end a container body aligning sleeve and having mounted therein an end unit support which is reciprocated axially of the body in a radial direction by cam means. The end unit support is also provided with a collet for interlocking engagement with an end unit neck portion.

Each carrier also includes a centrally located centering or pilot pin which is axially movable within the support in a radial direction and which is selectively projected initially to receive an end unit and thereafter to retract it.

In accordance with this invention, the endless conveyor has the individual carriers pivotally mounted therein, and there are cam and cam follower means which control the attitude of the carriers so that the attitude of the carriers remains constant as the carriers pass the adhesive applicator in the line of movement of the container bodies.

Another feature of the invention is the mounting of the adhesive applicator by means of a parallel bar support and to reciprocate the parallel bar support in timed relation to the presentation of an end unit to the adhesive applicator.

Another feature of the invention is a no end unit-no adhesive applicator function whereby, in the absence of an end unit to be presented by a carrier to the adhesive applicator, a pump mechanism is rendered inoperative.

With the above and other objects in view that will hereinafter appear, the nature of the invention will be more clearly understood by reference to the following detailed description, the appended claims, and the several views illustrated in the accompanying drawings.

IN THE DRAWINGS

FIG. 7 is a fragmentary elevational view showing further details of the conveyor and taken generally along the line 7—7 of FIG. 4.

FIG. 8 is a plan view of the base of the apparatus taken generally along the line 8—8 of FIG. 1.

Figure 1:
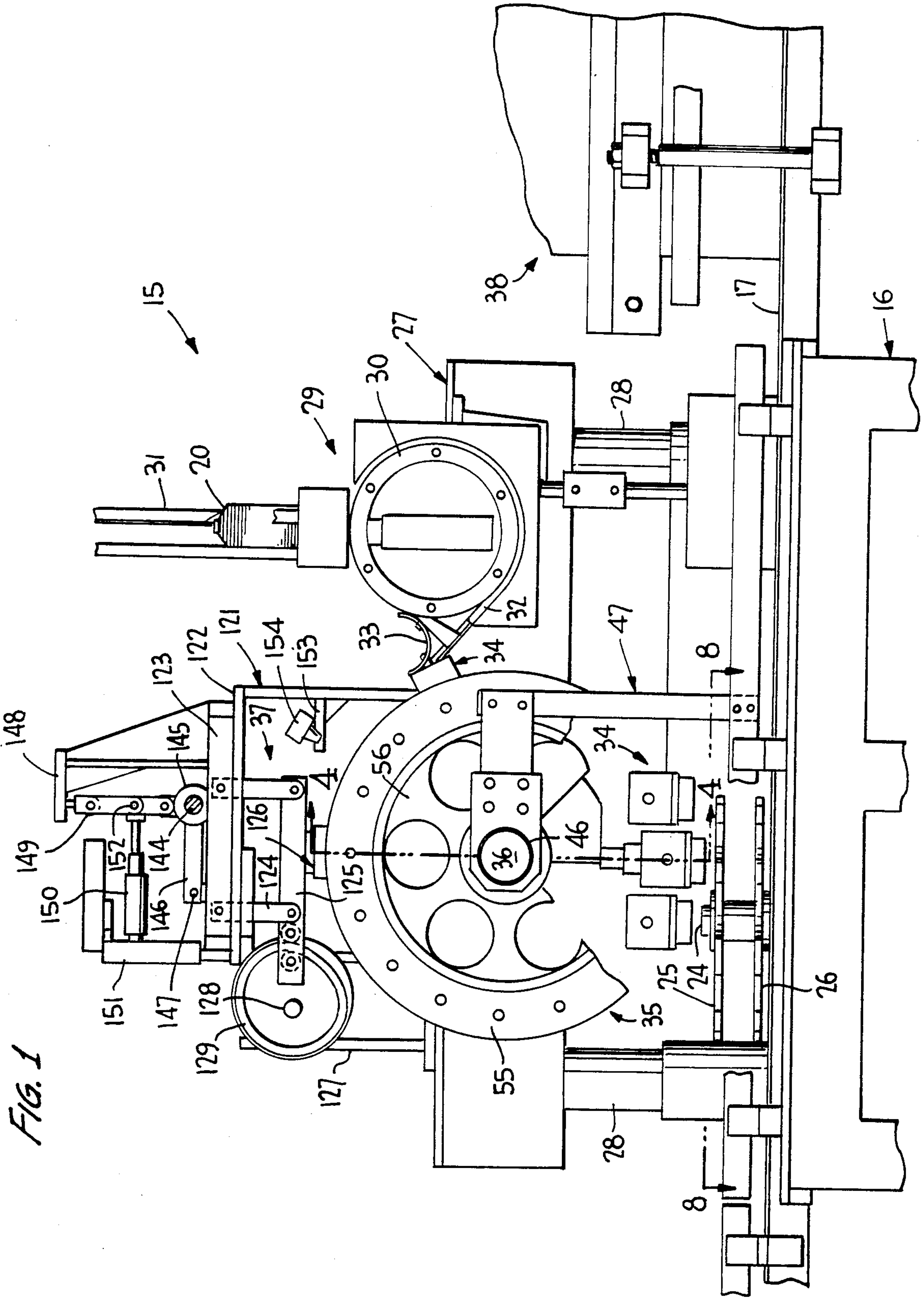
FIG. 1 is an elevational view of the apparatus with parts broken away, and shows the overall details of the apparatus.

Referring now to the drawings in detail, the overall machine or apparatus is illustrated in FIG. 1 and is generally identified by the numeral 15. The machine 15 includes a base 16 which may be of a conventional construction and which base has extending thereover an endless conveyor belt 17 on which tubular container bodies 18 having open upper ends pass for receiving dome shaped closing end units 20. In order that the container bodies 18 may move through a central part of the machine 15 in timed relation to the operation of the machine 15, the base 16 also carries a feed screw 21 which will pick up container bodies moving along the endless conveyor 17 and move them, independent of the conveyor 17, at a peselected linear rate and in a preselected spaced relation. In order that the container bodies may be maintained in an upright position during the application of the end units thereto in a manner to be described hereinafter, the base 16 also carries a double star wheel feeder generally identified by the numeral 22 and including a vertical drive shaft 24 and a pair of independent star wheels 25, 26. It is to be understood that the shaft 24 is to be driven in unison with the feed screw 21 so that individual pockets of the star wheels 25, 26 will be aligned with the grooves in the feed screw 21, as is best shown in FIG. 8.

A support frame 27 is mounted on and above the base 16 by means of column-type supports 28. The support frame carries an end unit feed apparatus generally identified by the numeral 29. The feed unit includes a conventional rotary feeding device 30 which receives end units 20 one at a time from an overlying hopper 31. The feed apparatus 29 also includes a discharge chute 32 through which end units are serially moved. The end of the discharge chute 32 is provided with a spring member 33 for applying each end unit to an associated carrier 34.

The frame 27 carries an endless conveyor 35 of the Ferris wheel type. The conveyor 35 is mounted for rotation about a fixed horizontal axis 36, and carries a plurality of the carriers 34 in circumferentially spaced relation.

Figures 2, 3:
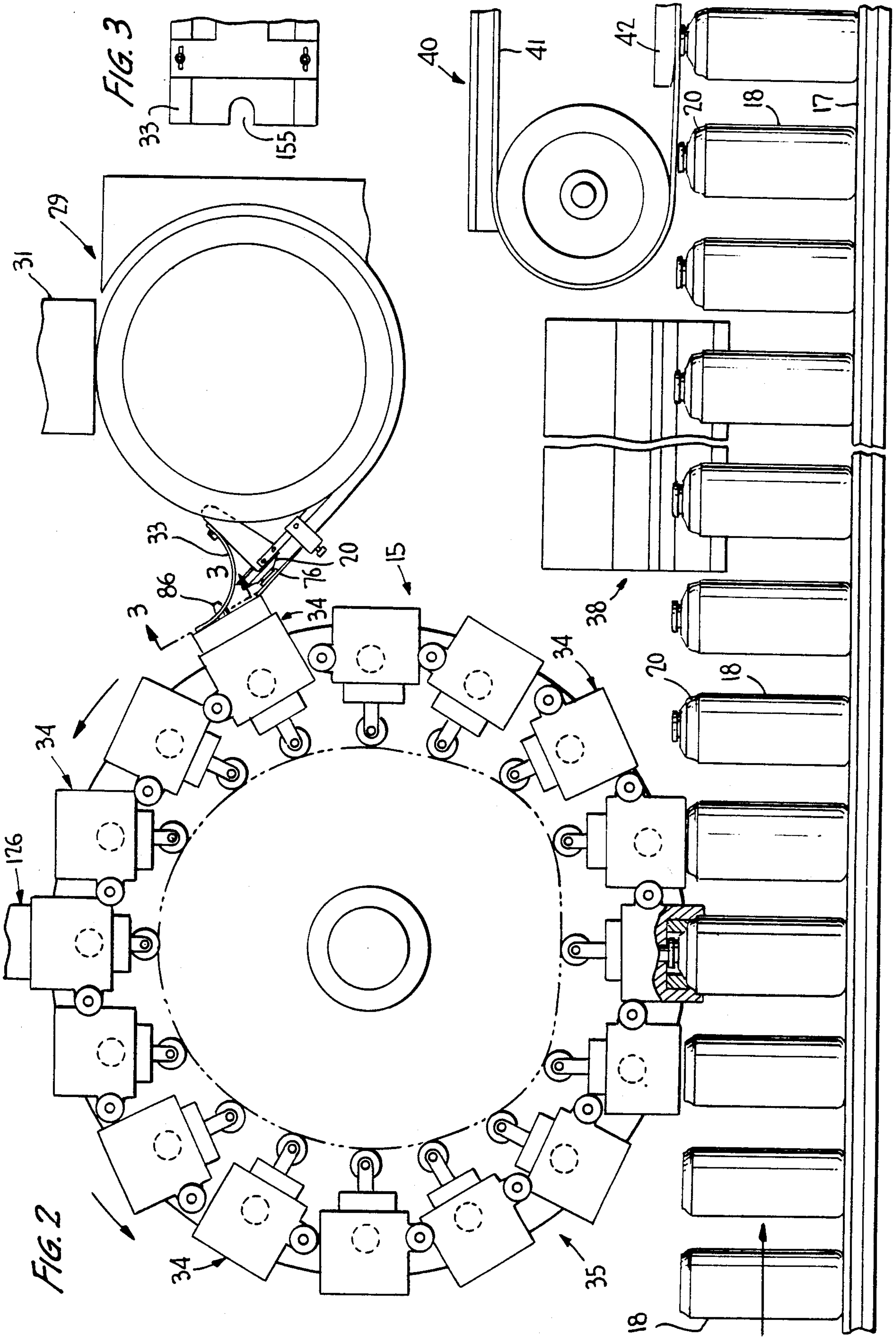
FIG. 2 is a schematic elevational view showing the movement of the carriers of the conveyor in a complete cycle in the application of the end units to container bodies followed by the final setting of the end units.
FIG. 3 is an enlarged fragmentary view of an end unit applicator spring taken generally along the line 3—3 of FIG. 2.

The frame 27 also carries an adhesive applicator assembly generally identified by the numeral 37. In accordance with the invention, a carrier 34 will pick up an end unit 20 and move it in a counterclockwise direction to present the end unit to the adhesive applicator assembly 37 whereat a narrow band of adhesive is applied to the interior of the end unit in the manner best shown in FIG. 5. The end unit 20, with the adhesive applied thereto, then continues in its counterclockwise path to the bottom of the conveyor 35 where it is aligned with and applied to the open end of an associated container body 18. The general sequence of movement of the carriers 34 is best illustrated in FIG. 2.

It is to be understood that an end unit 20 is not fully seated on a respective container body 18 by the machine 15. Instead, it is only partially telescoped on the body 18 and then, in a manner which does not form part of this invention, the assembled end unit and container body have telescoped portions thereof heated by means of an induction heater 38, after which the end units 20 are pressed down to their uniform height final condition by means of an apparatus 40 which includes an endless belt 41 which extends beneath a shoe 42 which is at a preselected elevation relative to the endless conveyor 17 carrying the assembled containers.

Figure 4:
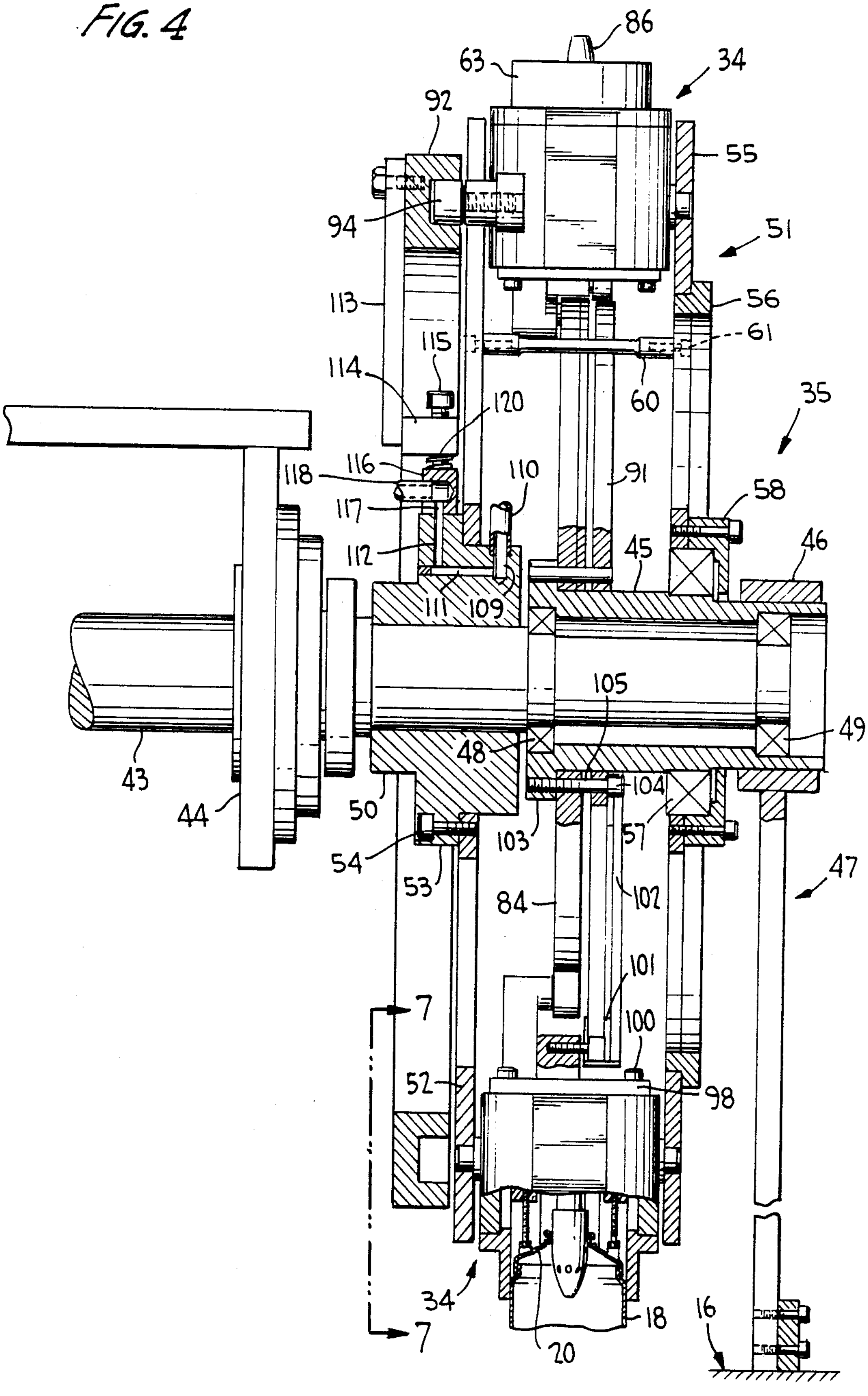
FIG. 4 is an enlarged fragmentary vertical sectional view taken through the conveyor generally along the line 4—4 of FIG. 1, and shows specifically the details thereof.

Reference is now made to FIG. 4 wherein the general details of the conveyor 35 are best illustrated. The conveyor 35 includes a drive shaft 43 which is supported at its left end (not shown) by a first bearing (also not shown) and generally at an intermediate point by a second bearing assembly 44. The shaft is driven in a manner not shown in timed relation to the rotation of the feed unit 29, the feed screw 21, and the star wheel assembly 22.

The right end of the shaft 43 is mounted in a tubular support 45 which, in turn, has its right end, which is free, mounted in a yoke 46 which is carried by an upstanding support arm assembly 47 mounted on the base 16. The right end portion of the shaft 43 is rotatably journalled within the tubular support by means of bearings 48, 49.

Between the bearing assembly 44 and the tubular support 45, the shaft 43 carries for rotation therewith a hub 50. The hub 50, in turn, carries a wheel assembly generally identified by the numeral 51. The wheel assembly 51 includes an inner side plate 52 which is secured at its inner periphery to a flange 53 on the hub 50 by means of a plurality of fasteners 54. The wheel assembly 51 also carries a front side plate 55 which is in the form of an annular member supported in turn by an annular support member 56. The annular support member 56 is carried by an outer race of a bearing 57 mounted on the tubular support 45 and is clamped in position relative to such bearing by means of a retaining flange 58.

The side plate 52 is connected to the annular support 56 by a plurality of spacers 60 which extend parallel to the shaft 43 and which have the opposite ends thereof secured to the side plate 52 and to the support 56 by means of fasteners 61. It is to be noted that the spacers 60 also connect the support 56 and the side plate 55 carried thereby to the side plate 52 for rotation in unison while maintaining the plates 52 and 55 in preselected spaced parallel relation.

The carriers 34 are positioned between the plates 52 and 55 for pivotal movement, as will be described in detail hereinafter.

Figure 6:
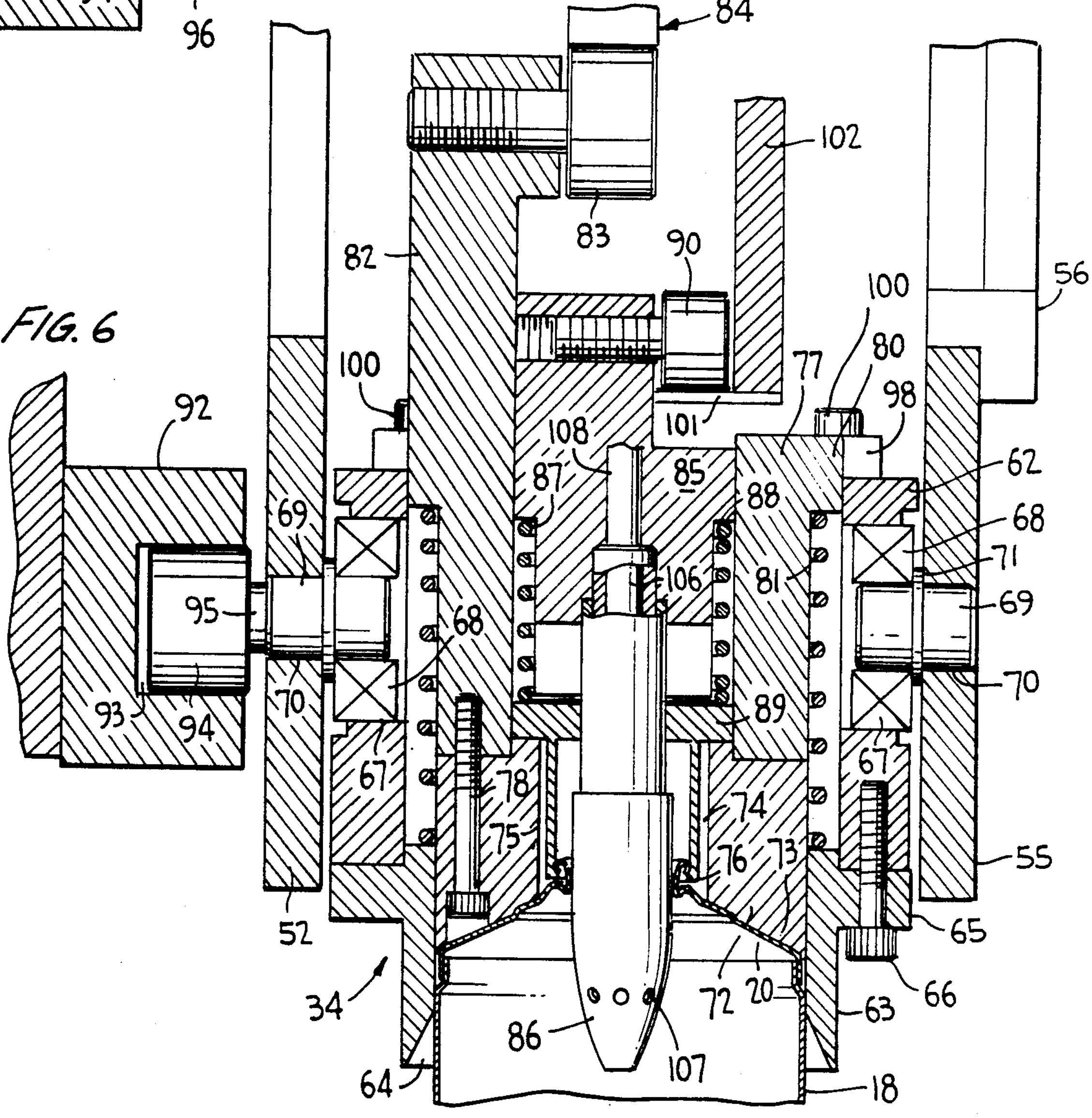
FIG. 6 is another fragmentary sectional view through the conveyor showing the general construction of one of the carriers as well as the positioning of an end unit relative to a container body.

Referring now to FIG. 6, it will be seen that each carrier 34 includes a tubular body 62 which has secured to the outer end thereof a sleeve-like projecting member 63 having a tapered entrance 64 and whose function is to receive a free end portion of a container body 18 and both to shape that free end portion and to align it with an end unit 20 which is being applied thereto. The sleeve 63 has an annular mounting flange 65 which carries fasteners 66 which thread into the radially outer end of the body or housing 62.

The housing 62 is provided with a pair of transversely aligned bores 67 in which there are positioned bearings 68. Each bearing 68 has positioned therein one end of a stub shaft 69 with the other end of each stub shaft 69 being fixed in a bore 70 in a respective one of the plates 52, 55. Each stub shaft 69 is provided with an intermediate annular flange 71 which functions as a spacer between the housing 62 and an adjacent one of the plates 52, 55.

The housing 62 has journalled therein for axial movement an end unit support 72 which has an outer face defining a seat 73 conformed to the configuration of the end unit 20. The support 72 is provided with a central axial bore 74 in which there is positioned a collet 75 for engaging a neck portion 76 of an associated end unit 20 to retain the end unit in seated engagement on the support 72.

The support 72 is carried by a tubular support member 77 and is secured thereto by circumferentially spaced, axially extending fasteners 78. The tubular support 77 has an enlargement 80 which is guided within the radially inner part of the housing 62 while the external diameter of the support 72 is of a size to be guided within the member 63. A compression spring 81 encircles the support 72 and the tubular support 71 and bears at one end against the member 63 and at its opposite end against the projection 80 constantly to urge the tubular support 77 and the support 72 carried thereby to a normally retracted position as is shown in FIG. 6.

The tubular support 77 also has a radially inwardly directed arm 82 which carries at its inner end a cam follower 83 which constantly engages a cam unit 84 to be described in detail hereinafter.

A further support 85 is telescoped within the tubular support 77 and carries a radially outwardly projecting centering or pilot pin 86 which is received through the neck portion 76 of the end unit 20, as is clearly shown in FIG. 6. The support 85 is constantly urged radially inwardly by means of a compression spring 87 which encircles a reduced diameter radially outer part of the support 85 and extends between a shoulder 88 of the support 85 and a base 89 of the collet 75. The normal projecting part of the pilot pin 86 is shown in FIG. 6 and is normally retained in this position by a cam follower 90 which rides on a cam 91.

Figure 5:
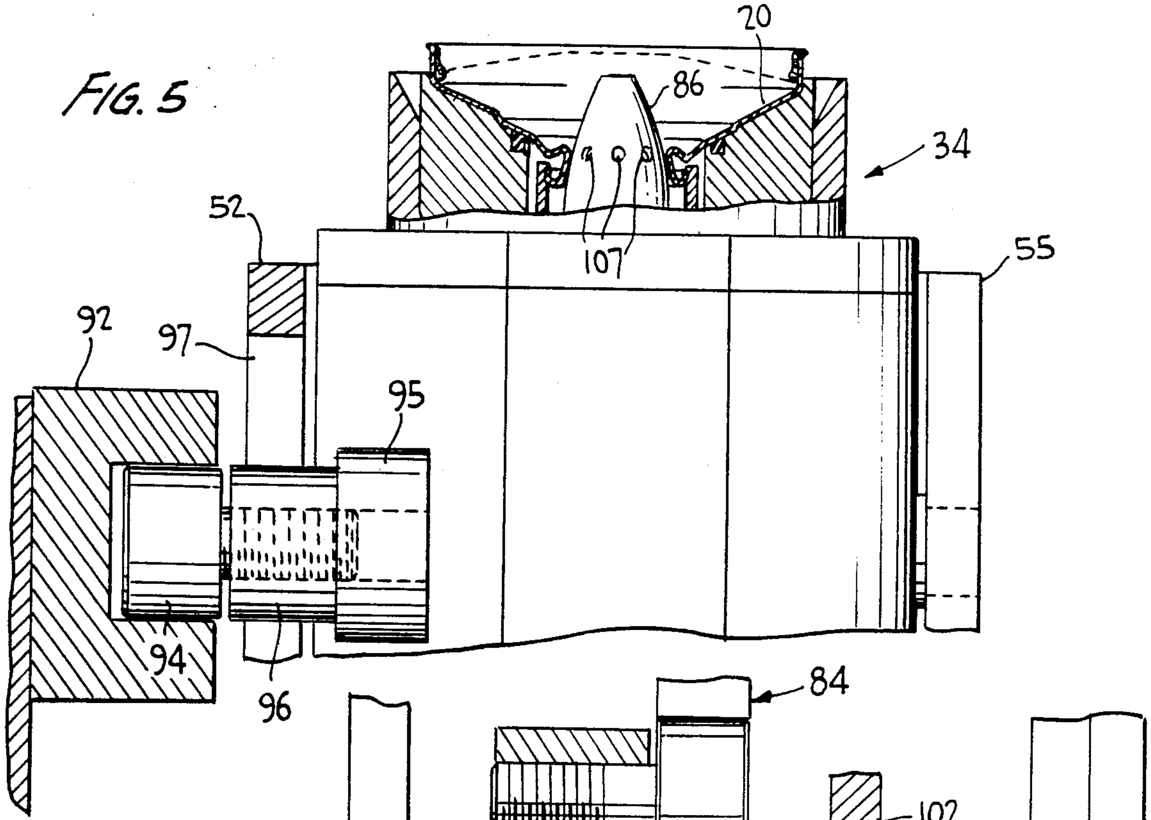
FIG. 5 is an enlarged fragmentary sectional view showing the presentation of an end unit to the adhesive applicator.

The attitude of each carrier 34 is controlled by a cam ring 92 which is fixed relative to the frame 27 and has an internal cam track 93 in which is received a cam follower 94. The cam follower 94, as is best shown in FIG. 5, is carried by a boss 95 which projects from one side of the housing 62 in offset relation, as is best shown in FIG. 7. In accordance with the position of the cam follower 94, as controlled by the cam track 92, the attitude of the carrier 34 may be controlled. At this time it is pointed out that the boss 95 has a transverse extension 96 which would project into the side plate 52. Accordingly, the side plate 52 is provided with a slot-like opening 97 for receiving the projection 96.

With reference to FIGS. 6 and 7, it is to be understood that the upper end of the housing 62 is provided with transversely extending retaining bars 98 which are secured in place by fasteners 100. The arm 82 has flats on the opposite sides thereof which engage the bars 98 and thus prevent rotation of the tubular support 80 and the end unit support 72. In a like manner, the upper part of the support 85 has opposite flat faces which engage the bars 98 and prevent rotation of the support 85 so that the cam follower 90 will always engage the cam 91.

It is also to be understood that the bars 98 serve to limit the upward or radially inward movement of the supports 77 and 85 so that it is not necessary for the cams 84 and 91 to be continuous.

On the other hand, it is absolutely necessary that at the time the assembled end unit and container body are to be separated from the carrier 34, the pilot pin 86 be in its retracted position. Accordingly, there is provided an ejector cam 101 which is in the form of a blade and which is carried by a support plate 102. The cam 101 engages beneath the cam follower 90 to assure the holding of the pilot pin 86 in its most recessed position. Thus, the cam 101 acts radially inwardly while the cam 91, which is also associated with the cam followers 90, acts radially outwardly.

Figure 9:
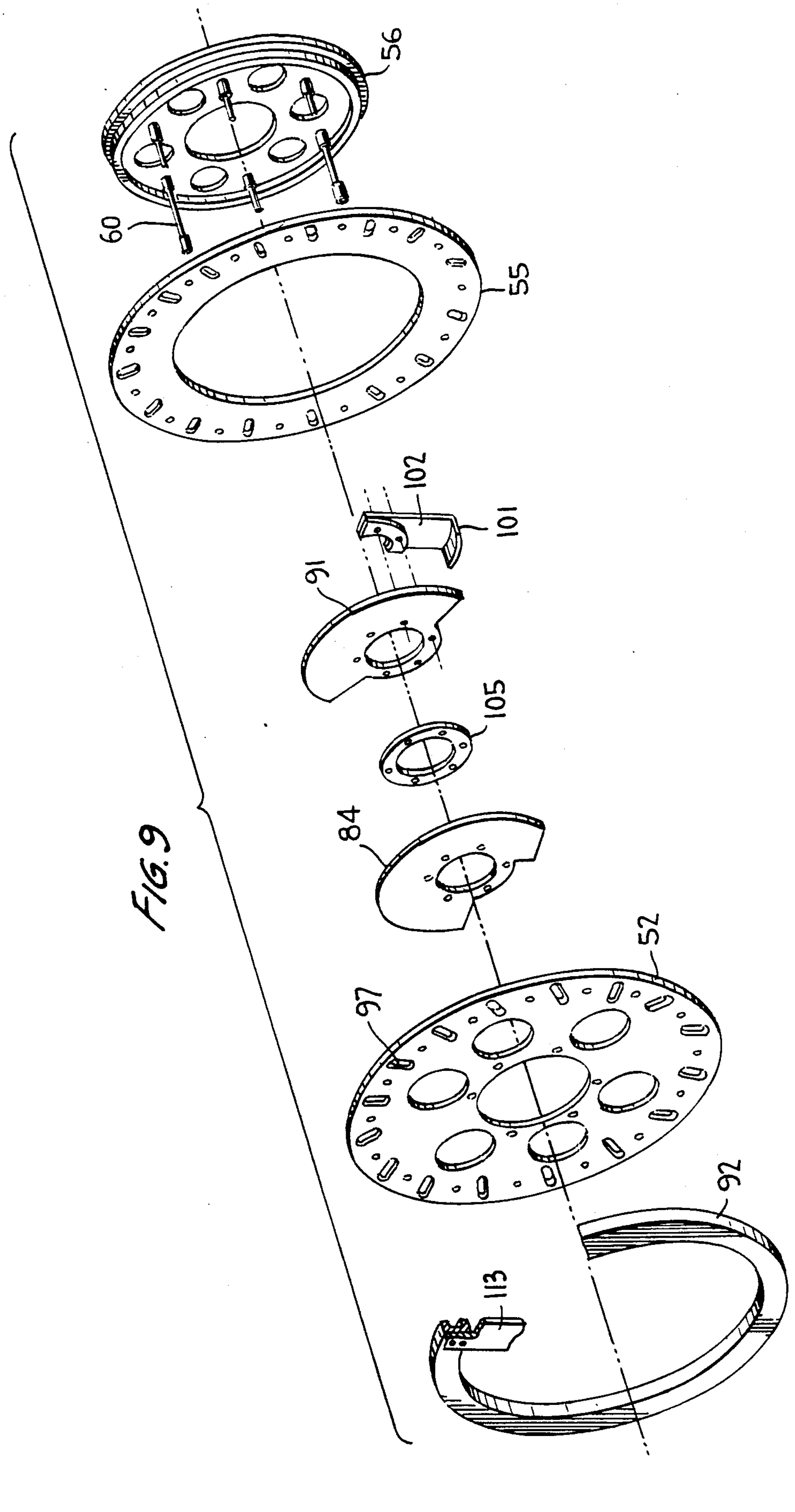
FIG. 9 is an exploded perspective view showing the details of side plates and cams of the conveyor.

Referring now to FIGS. 4 and 9, it will be seen that the tubular support 45 is provided at its axially inner end with a flange 103 to which the cams 84 and 91 and the support plate 102 are secured by means of fasteners 104. There is also a spacer 105 positioned between the cams 84 and 91.

At this time it is pointed out that compressed air is utilized to assure the separation of an end unit from the adhesive applicator assembly after the adhesive band has been applied. Accordingly, the pilot pin 84 has a central bore 106 therethrough which opens into passages 107 through the tip portion thereof, as is generally shown in FIGS. 5 and 6. In a like manner, the support 85 has a passage 108 which communicates with the bore 106 and opens through the exterior of the support 85. With reference to FIG. 4, it will be seen that the hub 50 has for each of the carriers 34 a radial passage 109 to which a hose 110 is connected and which hose has its opposite end connected to an associated support 85 in communication with the passage 108. For each radial passage 109 there is a plugged axial passage 111 and a further radial passage 112.

The cam track 92 has depending from the upper part thereof a support arm 113 which carries at its lower end a bracket 114 which, in turn, carries an adjustable clamping screw 115. A compressed air manifold 116 rides on the exterior surface of the projection or flange 53 of the hub 50 and has a radially inwardly directed supply passage 117 opening against the periphery of the flange 53. The manifold 116 is provided with a compressed air supply line 118. It will be seen that there is also a compression spring 120 between the bracket 114 and the manifold 116 so that the manifold 116 is constantly urged against the periphery of the flange 53 and is prevented from rotating with the hub 50. Thus, at the prescribed moment where an end unit having an adhesive applied thereto is to be separated from the adhesive applicator, compressed air is introduced into the end unit to effect such separation. This air pressure discharge supplements the holding action of the collet 75.

Referring once again to FIG. 1, it will be seen that the frame 27 carries a framework 121 which generally underlies the conveyor 35. The framework 121 includes a support plate 122 having mounted thereon a pair of parallel bars 123 which are spaced longitudinally of the axis of the conveyor 35. Each of the fixed parallel bars 123 has depending therefrom a link 124 which is pivotally connected to its respective bar 123. The links 124 have their lower ends pivotally connected to lower bars 125 which, in all positions thereof, remain parallel to the bar 123. An adhesive applicator, generally identified by the numeral 126, is mounted between the bars 125 for movement back and forth longitudinally of the machine 15.

Figure 10:
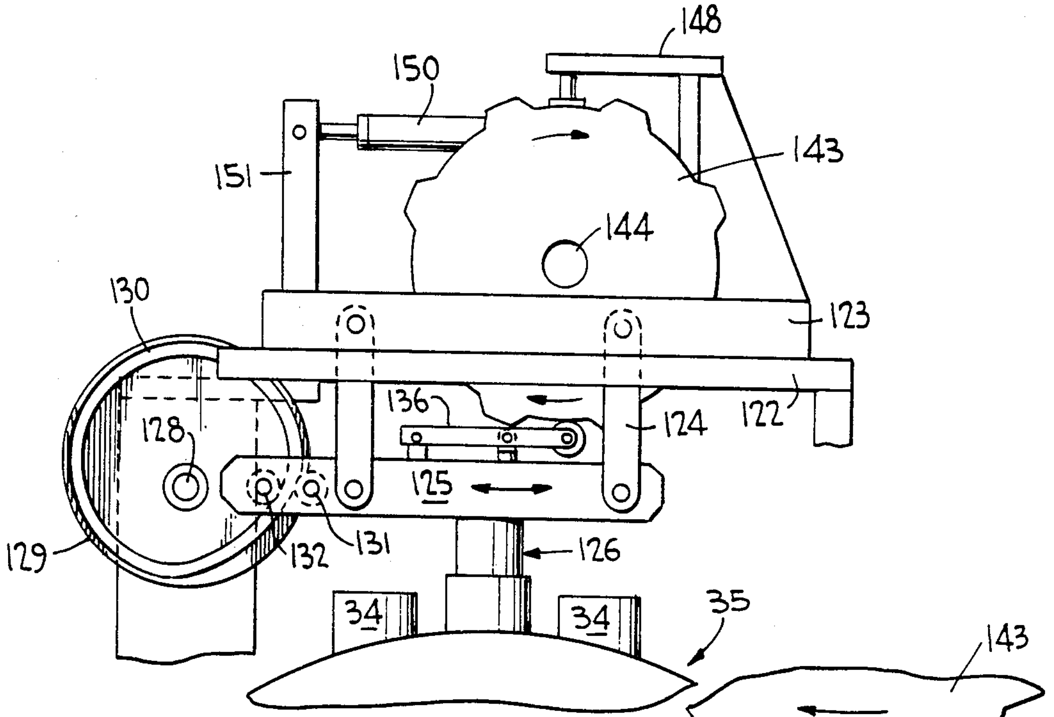
FIG. 10 is an enlarged fragmentary elevational view showing the general mounting of the adhesive applicator and the means for actuating the pump thereof.

The frame assembly 121 also includes a support structure 127 which, in turn carries a shaft 128 on which a cam 129 is mounted for rotation. The cam 129, as is best shown in FIG. 10, is of the double acting type and includes a cam flange 130 which is engaged by an exterior cam follower 131 and an interior cam follower 132, the cam followers 131, 132 being carried by an extension of one of the arms 125. In this manner, the adhesive applicator 126 is reciprocated in timed relation to the rotational movement of the carriers 34 so as to maintain alignment with the adhesive applicator 126 with an underlying carrier 34 and the end unit 20 carried thereby during the application of the adhesive.

The outermost end of the lever 136 carries a cam follower 141 which is engaged by lobes 142 of a cam 143 to actuate the adhesive applicator 126.

The cam 143 is carried by a shaft 144 which is rotated at one-eighth the speed of the cam shaft 128 so that the lobes 142 engage the cam follower 141 in timed relation to the positioning of an end unit for receiving an adhesive band.

Referring once again to FIG. 1, it will be seen that the shaft 144 is mounted in a housing 145 for rotation. The housing 145 is carried by a pair of horizontal arms 146 which are mounted relative to the plate 122 for swinging movement by means of aligned pivots 147. The housing 145 is connected to an uppermost fixed plate 148 of the frame assembly 121 by a multiple unit collapsible link 149. The link 149, when all of the links thereof are in a straight line, hold the housing 145 down and the shaft 144 and the cam 143 carried thereby in operative positions.

The alignment of the individual links of the multiple unit link 149 are normally held in alignment with each other by means of an extensible motor 150 which is carried by a suitable bracket 151 and connected to a central pivot 152 of the link 149. When the extensible motor 150 is retracted, the link 149 will effectively reduce in length to cause the housing 145 to move upwardly sufficiently to prevent the cam lobes 142 from engaging the cam follower 141 to operate the piston 133.

The frame assembly 121 also includes a bracket 153 which carries a detector unit 154 of a conventional type. The detector unit 154 inspects the carriers 34 in advance of the alignment of the carriers with the adhesive applicator 126 and determines whether an end unit is carried by a particular carrier. If the absence of an end unit is detected, at the time the empty carrier 34 is presented to the adhesive applicator 126, the extensible motor 150 will be retracted to raise the cam 143 and thus render the adhesive applicator 126 inoperative.

Referring once again to FIG. 2, it will be seen that when a carrier 34 is associated with the end unit feed device 29 in position to pick up an end unit 20, the centering or pilot pin 86 thereof is projected so as to be received in the open neck 76 of the end unit. This assures alignment of the end unit with the carrier 34. At the same time, the spring member 33, which has a notch 155 in the end thereof for receiving the pin 86, presses the end unit 20 towards the carrier 34 and seats the end unit in and on the support 72 with the neck 76 of the end unit engaging behind the fingers of the collet 75 releasably to lock the end unit to the support 72.

As the conveyor 35 continues its rotation, the pilot pin 86 is retracted.

Figure 11:
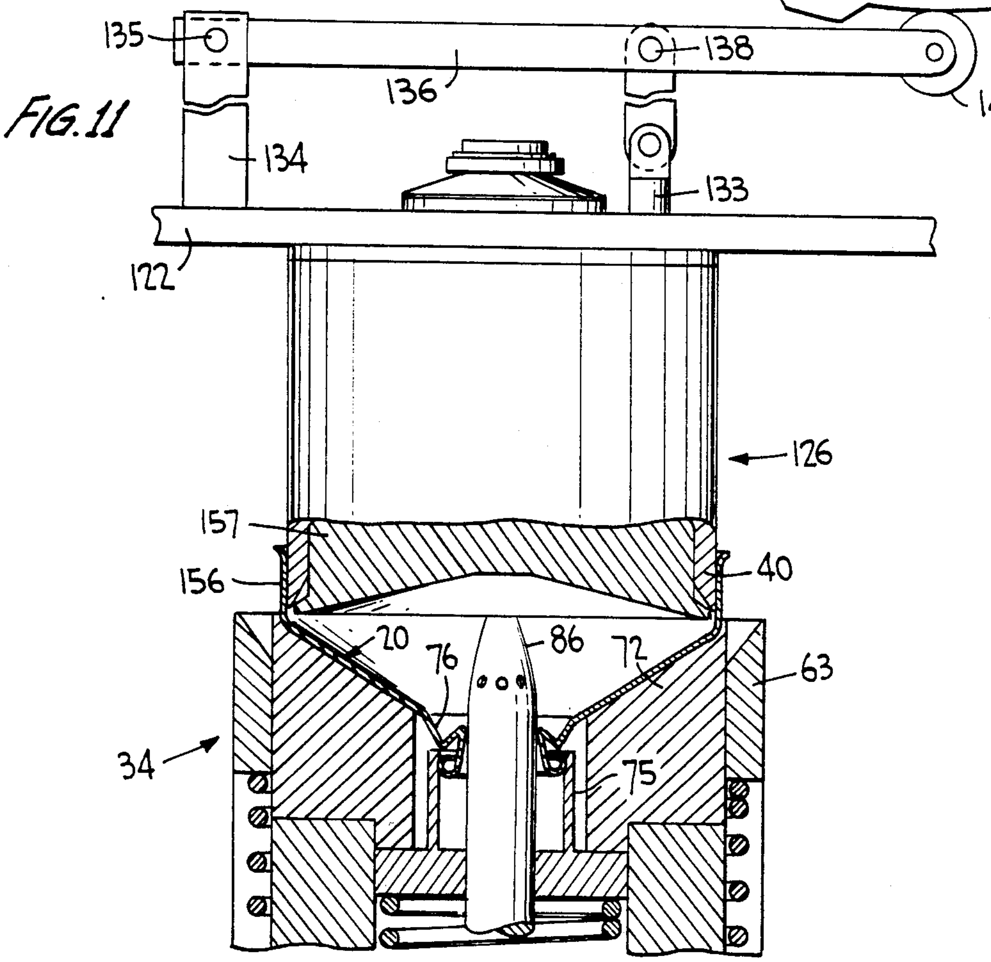
FIG. 11 is a sectional view through the adhesive applicator and shows the same in position for applying adhesive to an end unit.

As the carriers 34 approach the adhesive applicator 126, the cam 92 operates to change the attitude of the carriers 34 from radial positions to vertical positions so that when a carrier 34 approaches the adhesive applicator 126, it will be in a vertical position and will come into vertical axial alignment with the adhesive applicator. It is to be understood that while the carriers 34 are moving right to left as viewed in FIG. 4, due to the rotation of the conveyor 35 the adhesive applicator 126 will also be moving from right to left under the influence of the cam 129 at the same rate. Thus, after the carrier 34 becomes vertically aligned with the adhesive applicator 126, the cam 84 is effective to project the support 72 and the end unit 20 carried thereby radially outwardly with the cylindrical open end portion 156 of the end unit being telescoped over the body 157 of the adhesive applicator 126 ready to receive the band of adhesive as shown in FIG. 11.

As the telescoped end unit and adhesive applicator move to the left, the adhesive applicator 126 is actuated to extrude a band of adhesive against the interior surface of the cylindrical end portion 156 and at the same time the end unit 20 begins to retract relative to the applicator so as to cause the extruded ring or band of adhesive to be applied axially of the portion 156.

Although the collet 75 will normally function to assure retraction of the end unit with the carrier 34, in order to make certain of such retraction air under pressure may be introduced into the interior of the end unit through the pilot pin openings 107 as previously described.

The carriers 34, carrying the end units with the applied band of adhesive, move from the top of the conveyor 35 to the bottom of the conveyor into alignment with upstanding container bodies 18. During this time, the attitudes of the carriers 34 returns to radial position and then, as the carriers approach the bottom of their paths, their attitudes once again become vertical. This is clearly shown in the schematic showing of FIG. 2. Due to the natural downward swinging movement of the carriers 34, the end units are telescoped over the upper ends of the bodies 18 as is clearly shown in FIG. 2 and also in FIG. 6. While the end units are telescoped over the free upper ends of the bodies 18, they are not moved to their final positions as previously described.

Inasmuch as the pilot pins 86 project considerably out of the end unit supports 72, it is highly desirable that the pilot pins be retained in their fully retracted positions and for this purpose the cam blade 101 is provided. It is also desirable that the supports 72 remain retracted so that when the carriers 34 naturally move upwardly, they will separate from the assembled end unit 20 and container body 18 as is shown in FIG. 2.

As previously described, the sleeve 63 is for the purpose of assuring the cylindrical configuration of the upper part of the container body 18 so that telescoping of the end unit 20 thereover is assured. The sleeve 63 thus is of an interior diameter snugly to receive the upper portion of the body 18.

At this time it is pointed out that the adhesive is a heat activated adhesive and is preferably in the form of a hot melt adhesive. In order to activate the adhesive, the upper portions of the assembled containers pass through the induction heater 38 and, after the adhesive has been sufficiently heated, the end units 20 are passed to their final positions on the container bodies 18 by the belt 41.

The machine has been found to operate satisfactorily at high speeds and, due to the compactness thereof, it has been found to be one which may be commercially acceptable due to the limited amount of space required coupled with its production rate.

Although only a preferred embodiment of the invention has been specifically illustrated and described herein, it is to be understood that minor variations may be made in the machine without departing from the spirit and scope of the invention as defined by the appended claims.

We claim:

1. An apparatus for assembling end units to tubular bodies wherein each end unit has a cylindrical terminal portion for telescoping over an open end of an associated body, said apparatus comprising a first conveyor for conveying tubular bodies along a first preselected path, a second conveyor for conveying end units along a second preselected path from an end unit receiving position to a position overlying said first preselected path, said second conveyor having individual carriers for individual end units, means for supplying an end unit to each of said carriers in sequence, applicator means along said second path for applying a band of adhesive internally of the cylindrical terminal portion of each end unit in sequence, and means for placing each end unit having said band of adhesive thereon on a body in telescoped relation, said applicator means being mounted for parallel swinging movement adjacent a portion of said second path in timed relation to movement of a respective one of said carriers along said second path portion, and means cooperating with said carriers along said second path portion to maintain said carriers in a fixed attitude facing said applicator means.

2. Apparatus according to claim 1 wherein each of said carriers has a support for an end unit, means mounting said support for movement axially of the respective carrier, and means disposed adjacent said second path portion for automatically axially moving each support to engage an end unit carried by said support with said applicator means.

3. Apparatus according to claim 2 together with actuator means for actuating said applicator means in timed relation to said axial movement of one of said supports to apply adhesive to an end unit engaged with said applicator means.

4. An apparatus for assembling end units to tubular bodies wherein each end unit has a cylindrical terminal portion for telescoping over an open end of an associated body, said apparatus comprising a first conveyor for conveying tubular bodies along a first preselected path, a second conveyor for conveying end units along a second preselected path from an end unit receiving position to a position overlying said first preselected path, said second conveyor having individual carriers for individual end units, means for supplying an end unit to each of said carriers in sequence, applicator means along said second path for applying a band of adhesive internally of the cylindrical terminal portion of each end unit in sequence, and means for placing each end unit having said band of adhesive thereon on a body in telescoped relation, interrelated drive means for said first and second conveyors to effect the presentation of one of said carriers to each tubular body, and means cooperating with said carriers along said first path to maintain said carriers in a fixed attitude facing a respective tubular body, each of said carriers having a support for an end unit, means mounting said support for movement axially of the respective carrier, and means disposed adjacent said first path for automatically axially moving each support to engage an end unit carried by said support in telescoped relation to a respective tubular body.

5. An apparatus for assembling end units to tubular bodies wherein each end unit has a cylindrical terminal portion for telescoping over an open end of an associated body, said apparatus comprising a first conveyor for conveying tubular bodies along a first preselected path, a second conveyor for conveying end units along a second preselected path from an end unit receiving position to a position overlying said first preselected path, said second conveyor having individual carriers for individual end units, means for supplying an end unit to each of said carriers in sequence, applicator means along said second path for applying a band of adhesive internally of the cylindrical terminal portion of each end unit in sequence, and means for placing each end unit having said band of adhesive thereon on a body in telescoped relation, each of said carriers having a centering pin, said means for supplying end units being disposed along a selected portion of said second path, and means mounting each centering pin for movement axially of the respective carrier to a projecting position as the respective carrier moves along said second path selected portion to pick up an end unit.

6. An apparatus for assembling end units to tubular bodies wherein each end unit has a cylindrical terminal portion for telescoping over an open end of an associated body, said apparatus comprising a first conveyor for conveying tubular bodies along a first preselected path, a second conveyor for conveying end units along a second preselected path from an end unit receiving position to a position overlying said first preselected path, said second conveyor having individual carriers for individual end units, means for supplying an end unit to each of said carriers in sequence, applicator means along said second path for applying a band of adhesive internally of the cylindrical terminal portion of each end unit in sequence, and means for placing each end unit having said band of adhesive thereon on a body in telescoped relation, said second conveyor including a wheel mounted for rotation about a fixed axis, each of said carriers including a housing, means pivotally mounting each carrier housing on said wheel for pivoting about an axis disposed parallel to said fixed axis, a fixed cam and a cam follower carried by each carrier housing engaging said fixed cam and determining the attitude of each carrier.

7. Apparatus according to claim 6 wherein said carrier housing is tubular and has an axis, an end unit support mounted within and extending through said carrier housing, a second fixed cam, and a second cam follower carried by said support for engaging said second cam to controllably project said support at said applicator means and at said first conveyor.

8. Apparatus according to claim 7 wherein there is also mounted within said housing for axial movement relative to both said housing and said support an end unit centering pin, a third fixed cam, and a third cam follower connected to said centering pin and engageable with said third cam to selectively project said centering pin to receive an end unit.

9. Apparatus according to claim 8 wherein said centering pin is mounted within said support.

10. Apparatus according to claim 8 wherein said centering pin has associated therewith an air supply for said centering pin and said centering pin has discharge orifices connected to said air supply to aid in removing an end unit from said applicator means.

11. Apparatus according to claim 6 wherein said housing has an outermost part defining means for shaping and centering a tubular body end portion for receiving an end unit.

12. An apparatus for assembling end units to tubular bodies wherein each end unit has a cylindrical terminal portion for telescoping over an open end of an associated body, said apparatus comprising a first conveyor for conveying tubular bodies along a first preselected path, a second conveyor for conveying end units along a second preselected path from an end unit receiving position to a position overlying said first preselected path, said second conveyor having individual carriers for individual end units, means for supplying an end unit to each of said carriers in sequence, applicator means along said second path for applying a band of adhesive internally of the cylindrical terminal portion of each end unit in sequence, and means for placing each end unit having said band of adhesive thereon on a body in telescoped relation, means for detecting the absence of an end unit on a carrier advancing towards said applicator means, and means for rendering said applicator means inoperative when the detected carrier is presented to said applicator means.

13. Apparatus according to claim 12 wherein said applicator means includes a pump actuated by a continuously rotating cam, and said means for rendering said applicator means inoperative includes means for rendering said cam inoperative.

14. Apparatus according to claim 13 wherein said cam is carried by a shaft and said shaft has mounting means movable away from said pump.

15. Apparatus according to claim 14 wherein said mounting means includes a collapsible support member, and an actuator for selectively controlling collapsing of said collapsible support member.

* * * * *